United States Patent
Cargnoni et al.

(10) Patent No.: US 7,103,721 B2
(45) Date of Patent: Sep. 5, 2006

(54) CACHE ALLOCATION MECHANISM FOR BIASING SUBSEQUENT ALLOCATIONS BASED UPON CACHE DIRECTORY STATE

(75) Inventors: Robert Alan Cargnoni, Austin, TX (US); Guy Lynn Guthrie, Austin, TX (US); William John Starke, Round Rock, TX (US); Jeffrey Adam Stuecheli, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 470 days.

(21) Appl. No.: 10/425,459

(22) Filed: Apr. 28, 2003

(65) Prior Publication Data

US 2004/0215890 A1   Oct. 28, 2004

(51) Int. Cl.
   *G06F 12/12* (2006.01)
(52) U.S. Cl. .................. 711/133; 711/134; 711/136
(58) Field of Classification Search ............... None
   See application file for complete search history.

(56) References Cited

U.S. PATENT DOCUMENTS

| | | | |
|---|---|---|---|
| 5,594,886 A | 1/1997 | Smith et al. | |
| 5,715,427 A | 2/1998 | Barrera et al. | |
| 5,778,430 A | 7/1998 | Ish et al. | |
| 5,781,924 A | 7/1998 | Zaitzeva et al. | |
| 5,963,972 A | 10/1999 | Calder et al. | |
| 6,434,670 B1 | 8/2002 | Arimilli et al. | |
| 6,725,341 B1* | 4/2004 | Peir et al. | 711/141 |
| 6,738,888 B1* | 5/2004 | Chauvel | 711/207 |
| 6,745,291 B1 | 6/2004 | York | |
| 2002/0069328 A1* | 6/2002 | Chauvel | 711/130 |
| 2002/0069339 A1* | 6/2002 | Lasserre et al. | 711/201 |
| 2004/0268099 A1* | 12/2004 | Smith et al. | 712/233 |

OTHER PUBLICATIONS

Starke, Cache Allocation Mechanism for Saving Elected Unworthy Member via Substitute Victimization and Imputed Worthiness of Substitute Victim Member.
Cargnoni et al., Cache Allocation Mechanism for Saving Multiple Elected Unworthy Members via Substitute Victimization and Imputed Worthiness of Multiple Substitute Victim Members.
Arimilli et al., Programming Means for Dynamic Specification of Cache Management Preferences.

* cited by examiner

*Primary Examiner*—Reginald G. Bragdon
*Assistant Examiner*—Daniel Ko
(74) *Attorney, Agent, or Firm*—Duke W. Yee; Thomas E. Tyson; Mary Adams-Moe

(57) ABSTRACT

An improved method and apparatus for selecting invalid members as victims in a least recently used cache system. An invalid cache line selection unit has an input connected to a cache directory and an output connected to a most recently used update logic. In response to a miss in the cache, an invalid cache line is identified from information in the cache directory by the invalid cache line selection unit. This invalid cache line is updated to be the next victim by the most recently used update logic, rather than attempting to override the current victim selection by a least recently used victim selection logic. The next victim also may be selected in response to a cache hit in which information from the cache directory also is read.

15 Claims, 13 Drawing Sheets

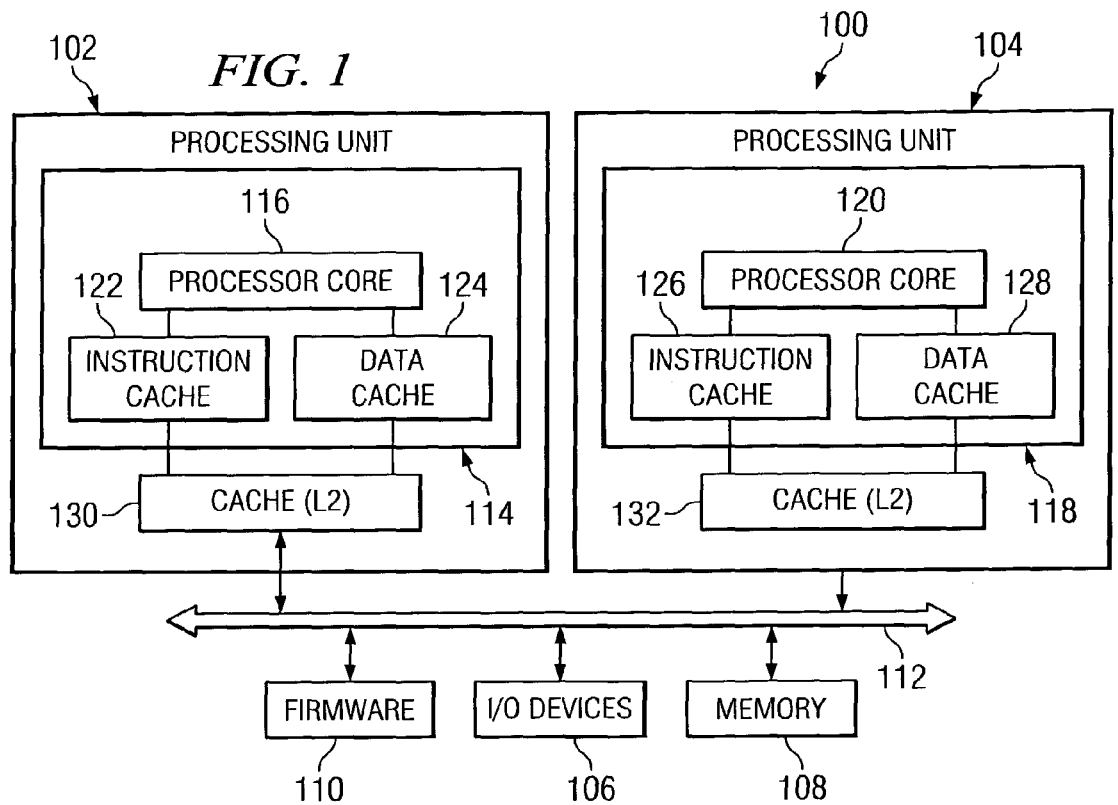
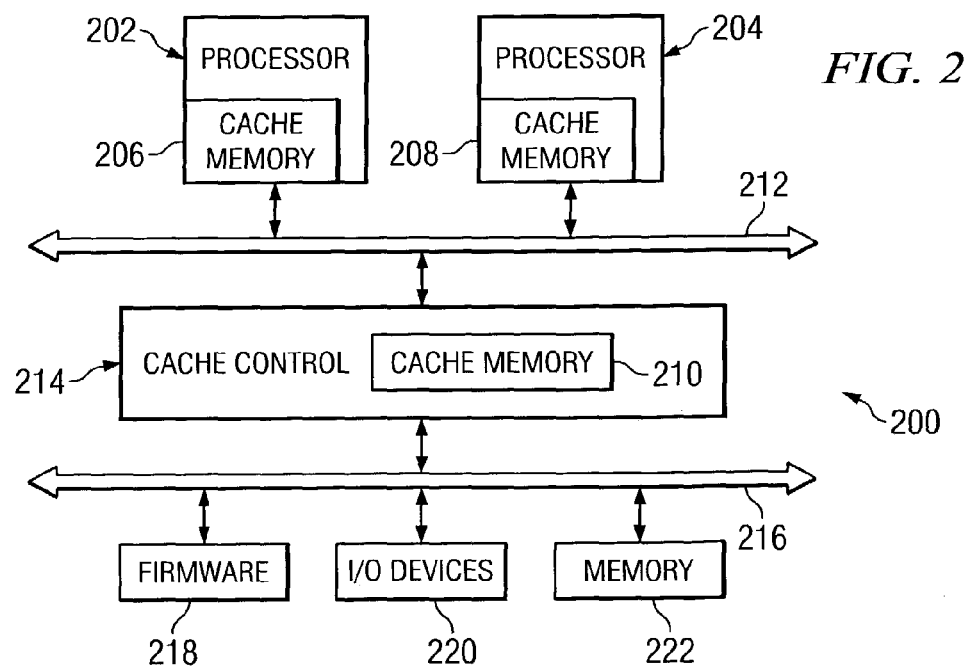

CACHE ALLOCATION MECHANISM FOR BIASING SUBSEQUENT ALLOCATIONS BASED UPON CACHE DIRECTORY STATE

CROSS REFERENCE TO RELATED APPLICATIONS

The present invention is related to the following applications entitled: "Cache Allocation Mechanism for Saving Elected Unworthy Member via Substitute Victimization and Imputed Worthiness of Substitute Victim Member", Ser. No. 10/425,442, "Cache Allocation Mechanism for Saving Multiple Elected Unworthy Members via Substitute Victimization and Imputed Worthiness of Multiple Substitute Victim Members", Ser. No. 10/425,444, and "Programming Means for Dynamic Specification of Cache Management Preferences", Ser. No. 10/425,443, all filed Apr. 28, 2003, assigned to the same assignee, and incorporated herein by reference.

BACKGROUND OF THE INVENTION

1. Technical Field

The present invention relates generally to an improved data processing system, and in particular, to an improved method and apparatus for caching data in a memory.

2. Description of Related Art

Most early data processing systems consisted basically of a central processing unit, a main memory, and some sort of secondary input/output ("I/O") capability. In these earlier systems, the main memory was the limiting element. Typically, the main memory was designed first and the CPU was then created to match the speed of the memory. This matching was performed to optimize the processing speed and is necessary even with today's high speed computers. Over time, logic circuit speeds increased along with the capacity requirements of main memory. With the need for increasing capacity in the main memory, the speed of the main memory could not keep up with the increasing speed of the CPU. Consequently, a gap developed between the main memory and the processor cycle time, which resulted in un-optimized processing speeds. As a result, a cache memory was developed to bridge the gap between the memory and the processor cycle time.

Using a cache to bridge the performance gap between a processor and main memory has become important in data processing systems of various designs from personal computers to work stations to data processing systems with high performance processors. A cache memory is an auxiliary memory that provides a buffering capability through which a relatively slow main memory can interface with a processor at the processor's cycle time to optimize the performance of the data processing system. Requests are first sent to the cache to determine whether the data or instructions requested are present in the cache memory. A "hit" occurs when the desired information is found in the cache. A "miss" occurs when a request or access to the cache does not produce the desired information. In response to a miss, one of the cache "lines" is replaced with a new one. The method to select a line to replace is called a replacement policy.

A number of different schemes for organizing a cache memory exist. For example, a fully associative mapping organization may be employed whereby a data address may exist in any location in the cache, or a direct mapping scheme may be employed in a cache memory whereby a data address may exist in only one location in the cache. A set associative scheme may be employed by partitioning the cache into distinct classes of lines, wherein each class contains a small fixed number of lines. This approach is somewhere between a direct mapped and a full associative cache. The classes of lines are usually referred to as "congruence classes." The lines in a congruence class are usually referred to as sets (which indicate the number of locations an address can reside) in a congruence class in a set associative cache.

One generally used type of replacement policy is the least recently used (LRU) policy. An LRU policy is built upon the premise that the least recently used cache line in a congruence class is the least worthy of being retained. So, when it becomes necessary to evict a cache line to make room for a new one, an LRU policy chooses as a victim a cache line which is the least recently accessed set (or member) within a congruence class.

For an LRU policy, two types of operations must be carried out against the LRU state (which is maintained for each congruence class in a cache).

A most recently used-update (MRU-update) operation typically occurs due to a cache hit. It adjusts the LRU state such that the "hit" member is ordered ahead of all other members in that congruence class, establishing the cache line in that member position as the most worthy member in the congruence class.

A least recently used-victim-selection (LRU-victim-selection) operation typically occurs when a cache miss requires that a member be allocated to hold a cache line arriving from elsewhere in the storage hierarchy. The operation determines which cache line is the least worthy of being retained in the congruence class, evicts that cache line, and places the newly arriving cache line in its member position.

Often, favorable operating characteristics and reduced complexity implementations for a cache can be achieved when the victim selection and state update portions of a cache allocation policy are tightly integrated with a common pipeline for accessing the cache arrays, directory arrays, and allocation policy (e.g. LRU) state arrays.

Further, in such implementations, further benefits are typically derived when the victim selection occurs as early as possible in the common pipeline, and when for each operational use of the pipeline, at most one cache allocation policy state update is performed.

Those of ordinary skill in the art will recognize the following properties. The state information for the invalid member selection override exists in the directory. As caches grow larger (affecting size of data array, directory array, and LRU state array), the latency through a directory and to the victim selection logic grows relative to the latency through the LRU state array to the victim selection logic. Also, the circuit complexity (and latency) grows. Increases in the aggressiveness of processor operating frequencies compound this latency difference, making it more and more difficult to balance the desire to select a victim early with difference in latency between early arriving LRU state information and ever-later arriving invalid cache state information. With the currently available invalid cache line selection processes, the redirection or selection of an invalid cache line as a victim is not made quickly enough with respect to operating frequencies of the hardware. As a result, attempting to set an invalid cache line as a victim may not occur quickly enough with respect to the least recently used victim selection logic.

Therefore, it would be advantageous to have an improved method, apparatus, and computer instructions for marking or selecting an invalid cache line as a victim.

SUMMARY OF THE INVENTION

The present invention provides an improved method and apparatus for selecting invalid members as victims in a least recently used cache system. An invalid cache line selection unit has an input connected to a cache directory and an output connected to a most recently used update logic. In response to a miss in the cache, an invalid cache line is identified from information in the cache directory by the invalid cache line selection unit. This invalid cache line is updated to be the next victim by the most recently used update logic, rather than attempting to override the current victim selection by a least recently used victim selection logic. The next victim also may be selected in response to a cache hit in which information from the cache directory also is read.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a block diagram of a data processing system in which a preferred embodiment of the present invention may be implemented;

FIG. 2 is a diagram of another data processing system in which the present invention may be implemented;

DETAILED DESCRIPTION OF THE PREFERRED EMBODIMENT

Figure 3:
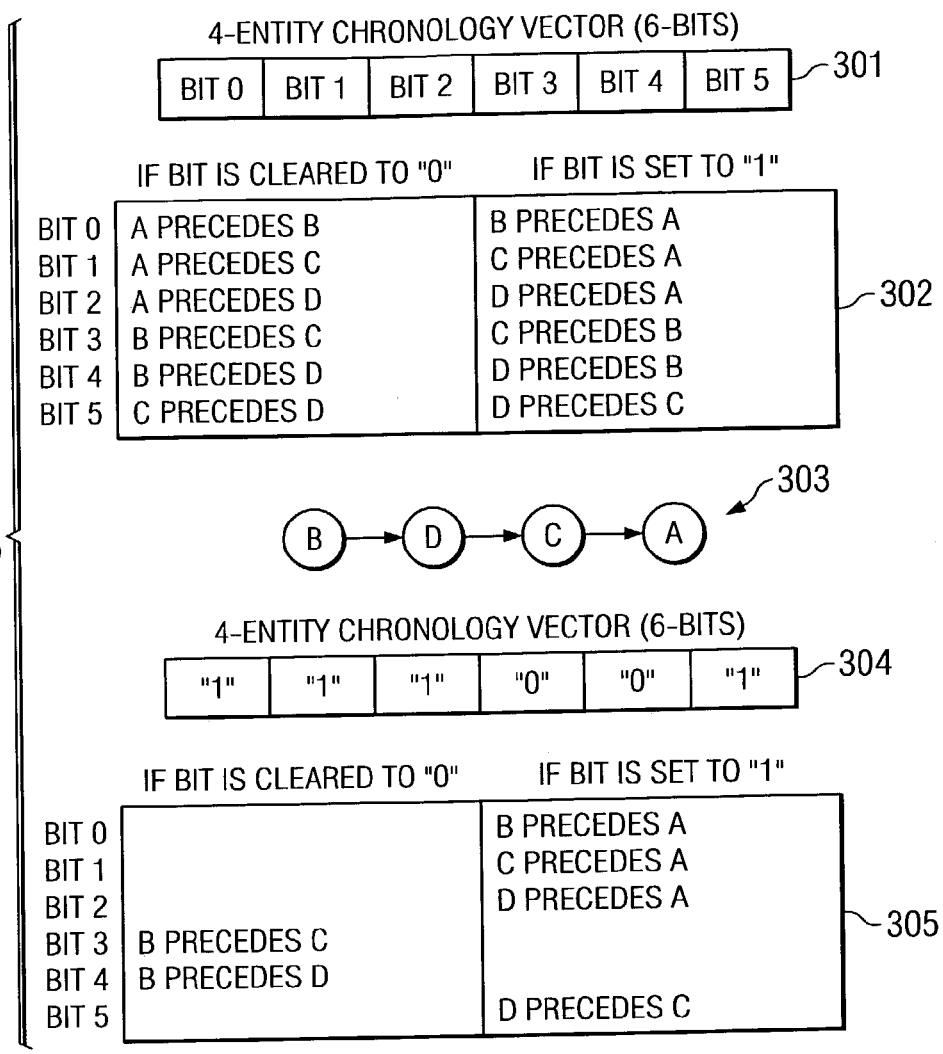
FIG. 3 is a diagram of components used in ordering entities.

With reference now to the figures and in particular with reference to FIG. 1, a block diagram of a data processing system is depicted in which a preferred embodiment of the present invention may be implemented. As illustrated, Data processing system 100 is an example of a conventional multi-processor computer system. Data processing system 100 has several processing units, two of which, processing unit 102 and processing unit 104 are depicted. These processing units are connected to various peripheral devices, including input/output (I/O) devices 106 used to communicate with a user, memory 108 used by the processing units to carry out program instructions, and firmware 110 whose primary purpose is to seek out and load an operating system from one of the peripherals whenever the computer is first turned on. I/O devices 106 may take various forms, such as a display monitor, keyboard, and permanent storage device.

Processing units 102 and 104 communicate with the peripheral devices by various means, including, for example, a generalized interconnect or bus 112. Data processing system 100 may have many additional components which are not shown, such as serial and parallel ports for connection to devices, such as modems or printers. Those of ordinary skill in the art will further appreciate that there are other components that might be used in conjunction with those shown in the block diagram of FIG. 1. For example, a display adapter might be used to control a video display monitor, and a memory controller may be used to access memory 108. The data processing system also can have more than two processing units.

In a symmetric multi-processor (SMP) computer, all of the processing units are generally identical. In other words, the processors all use a common set or subset of instructions and protocols to operate, and generally have the same architecture. A typical architecture is shown in FIG. 1. In these examples, a processing unit 102 includes integrated chip 114, which contains processor core 116, and processing unit 104 contains integrated circuit 118, which contains processing core 120, instruction cache 126, and data cache 128. Processor cores 116 and 120 include registers and execution units. These components are used to carry out program instructions to operate data processing system 100.

As illustrated, processing unit 102 and processing unit 104 also include caches, such as instruction cache 122, data cache 124, instruction cache 126, and data cache 128, within integrated circuits 114 and 118 in FIG. 1. These caches are implemented using high speed memory devices. Caches are commonly used to temporarily store values that might be repeatedly accessed by a processor, to speed up processing by avoiding the longer step of loading the values from memory 108. These caches also are referred to as "on-board" when they are integrally packaged with the processor core on a single integrated chip. In these examples, the caches located within integrated circuit 114 and integrated circuit 118 are level 1 (L1) caches. Each cache is associated with a cache controller (not shown) that manages the transfer of data between the processor core and the cache memory.

A processing unit can include additional caches. For example, processing unit 102 includes cache 130 and processing unit 104 includes cache 132, which are referred to as level 2 (L2) caches because these memories support the on-board or L1 caches. In other words, cache 130 and cache 132 act as intermediaries between memory 108 and the on-board L1 caches: instruction cache 122, data cache 124, instruction cache 126, and data cache 128. These L2 caches can store a much larger amount of information, such as instructions and data, than the on-board caches can, but with a longer access penalty. For example, cache 130 and cache 132 may be integrated in chips having a storage capacity of 256 or 512 kilobytes, while instruction cache 122 and data cache 124 in processing unit 102 and instruction cache 126 and data cache 128 in processing unit 104 may have 64 kilobytes of total storage.

As illustrated, both cache 130 and 132 are connected to bus 112. All loading of information from memory 108 into processor core 116 passes through cache 130, while all loading of information into processor core 120 passes through cache 132. Although FIG. 1 depicts only a two-level cache hierarchy, multi-level cache hierarchies can be provided where there are many levels of serially connected caches. For example, L3, L4, and L5 caches may be used.

In an SMP computer, providing a coherent memory system is important. In other words, it is important to cause write operations to each individual memory location to be serialized in some order for all processors. For example, assume a location in memory is modified by a sequence of write operations to take on the values: 1, 2, 3, 4. In a cache coherent system, all processors will observe the writes to a given location to take place in the order shown. However, it is possible for a processing element to miss a write to the memory location. A given processing element reading the memory location could see the sequence 1, 3, 4, missing the update to the value 2. A system that implements these properties is said to be "coherent". Virtually all coherency protocols operate only to the granularity of the size of a cache block. That is to say, the coherency protocol controls the movement of and write permissions for data on a cache block basis and not separately for each individual memory location.

A number of protocols and techniques for achieving cache coherence are known. At the heart of all these mechanisms for maintaining coherency is the requirement that the protocols allow only one processor to have a "permission" that allows a write to a given memory location (cache block) at any given point in time. As a consequence of this requirement, whenever a processor attempts to write to a memory location, the processor must first inform all other processors of its desire to write the location and receive permission from all other processors to carry out the write. The key issue is that all other processors in the system must be informed of the write by the initiating processor before the write occurs. Furthermore, if a block is present in the L1 cache of a given processing unit, this block is also present in the L2 and L3 caches of that processing unit. This property is known as inclusion and is well known to those skilled in the art.

To implement cache coherency in a system, the processors communicate over a common generalized interconnect, such as bus 112. The processors pass messages over the interconnect indicating their desire to read or write memory locations. When an operation is placed on the interconnect, all of the other processors "snoop" (monitor) this operation and decide if the state of their caches can allow the requested operation to proceed and if so, under what conditions. There are several bus transactions that require snooping and follow-up action to honor the bus transactions and maintain memory coherency. The snooping operation is triggered by the receipt of a qualified snoop request, generated by the assertion of certain bus signals. Instruction processing is interrupted only when a snoop hit occurs and the snoop state machine determines that an additional cache snoop is required to resolve the coherency of the offended sector.

With reference now to FIG. 2, a diagram of another data processing system is depicted in accordance with a preferred embodiment of the present invention. The processes and apparatus of the present invention may also be implemented within data processing system 200. This particular example, illustrated a shared L2 cache, while data processing system 100 in FIG. 1 illustrated unshared caches.

In this example, data processing system 200 includes two processors, processor 202 and processor 204. Cache memory 206 and cache memory 208 are cache memories located within processor 202 and processor 204, respectively. In this example, cache memory 210 is a level 2 cache memory that is shared by both processors. Access to this cache memory is provided by bus 212. Cache control 214 contains the logic for handling cache lines within memory 210 in response to requests from processors 202 and 204. Cache control 214 is connected to other components through bus 216. For example, firmware 218, I/O devices 220 and memory 222 are connected to bus 216.

Data processing system 100 and data processing system 200 include mechanisms for handling cache lines. A cache line is a unit of data that is retrieved from memory to a cache. A cache line is typically the smallest unit of data that may be sent from a memory to a cache. The present invention provides a method, apparatus, and computer instructions for supplementing least recently used (LRU) policies applied to handling cache lines in a cache.

An LRU policy, by definition, must maintain an ordered list of all members within each congruence class. A vector of "chronology bits" provides a mechanism for indicating an order amongst multiple entities. The vector consists of one bit for each possible pair of entities. The bit indicates the relative ordering within the pair. That is, for a given pair (i, j) the bit might be set to a "one" value if entity j precedes entity i, and the bit might be cleared to a "zero" value if entity i precedes entity j.

For example, referring now to FIG. 3, components used in ordering entities are illustrated. Chronology vector 301 indicates an ordering between four entities (a, b, c, d) and consists of six bits. Referring to table 302, bit 0 indicates the ordering between entities a and b, bit 1 indicates the ordering between entities a and c, bit 2 indicates ordering between a and d, bit 3 indicates ordering for b and c, bit 4 is used in ordering b and d, and bit 5 indicates ordering between c and d.

To specify the ordering of members in ordering 303 as follows: b, d, c, a, the vector 304 would have the value: "111001", indicating an order specified by the rules 305 for each chronology bit.

In general, a vector of chronology bits for determining the ordering amongst n entities requires $(n \times (n-1))/2$ bits.

Applying this technique to implement a "true" LRU policy for a 2-way associative cache requires a 1-bit vector; or for a 3-way cache requires a 3-bit vector; or 4-way: 6-bits; or 5-way: 10-bits; or 8-way: 28-bits; or 16-way: 120-bits.

While chronology bits do not provide the most efficient possible bit-encoding (e.g., an encoding requiring the smallest number of bits), they do possess attributes ideally suited to a fast and inexpensive circuit implementation.

With a chronology vector implementation, an MRU-update operation is accomplished by setting a subset of the bits in the vector to a constant pattern (associated with the updated member) while leaving the other bits in the vector unchanged. The subset is comprised of the n−1 bits (where n is the associativity of the cache) which define the ordering between the updated member and each of the other members in the congruence class.

Figure 4A:
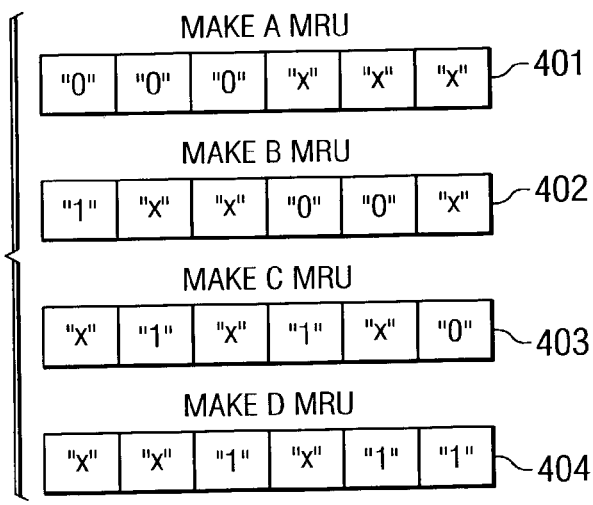
FIG. 4A is a diagram of constant patterns.
Figure 4B:
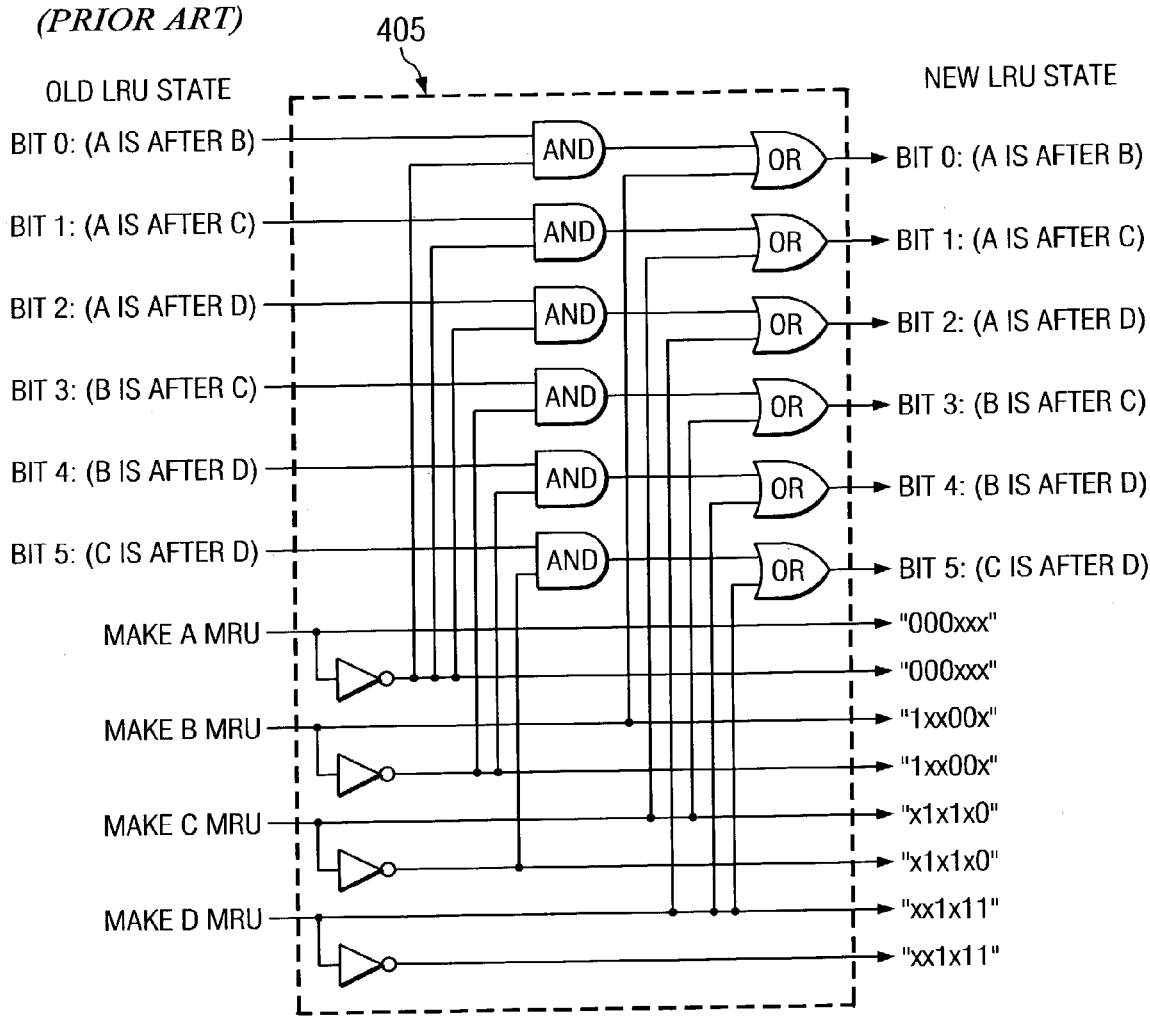
FIG. 4B is a circuit diagram of a known MRU-update function.

For example, referring now to FIG. 4A, the constant patterns are shown for a 401, b 402, c 403, and d 404. Turning next to FIG. 4B, circuit diagram 405 illustrates the MRU-update function in a manner familiar to those skilled in the art. Constant patterns 401, 402, 403, and 404, from FIG. 4A are used to annotate the control lines in circuit diagram 405 in FIG. 4B to associate each constant pattern with the set of control lines that establish that pattern into the LRU state.

With a chronology vector implementation, an LRU-victim-selection operation is accomplished by implementing an equation for each member position. The equation for a given member tests the same subset of n−1 bits (described above) associated with that member in the MRU-update operation, i.e., those bits which define the ordering between the member and each of the other members in the congruence class. The equation compares the tested bits against a constant pattern, returning "true" if there is a match, and returning "false" if there is not a match. As illustrated, one and only one of the equations will return a "true" value. The member position associated with that equation is the victim member position.

Figure 5A:
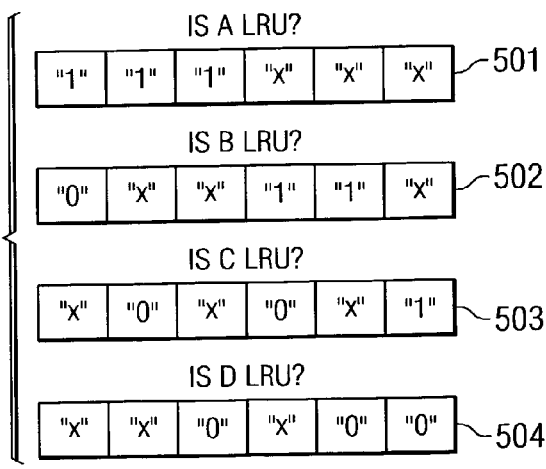
FIG. 5A is a diagram of constant patterns.
Figure 5B:
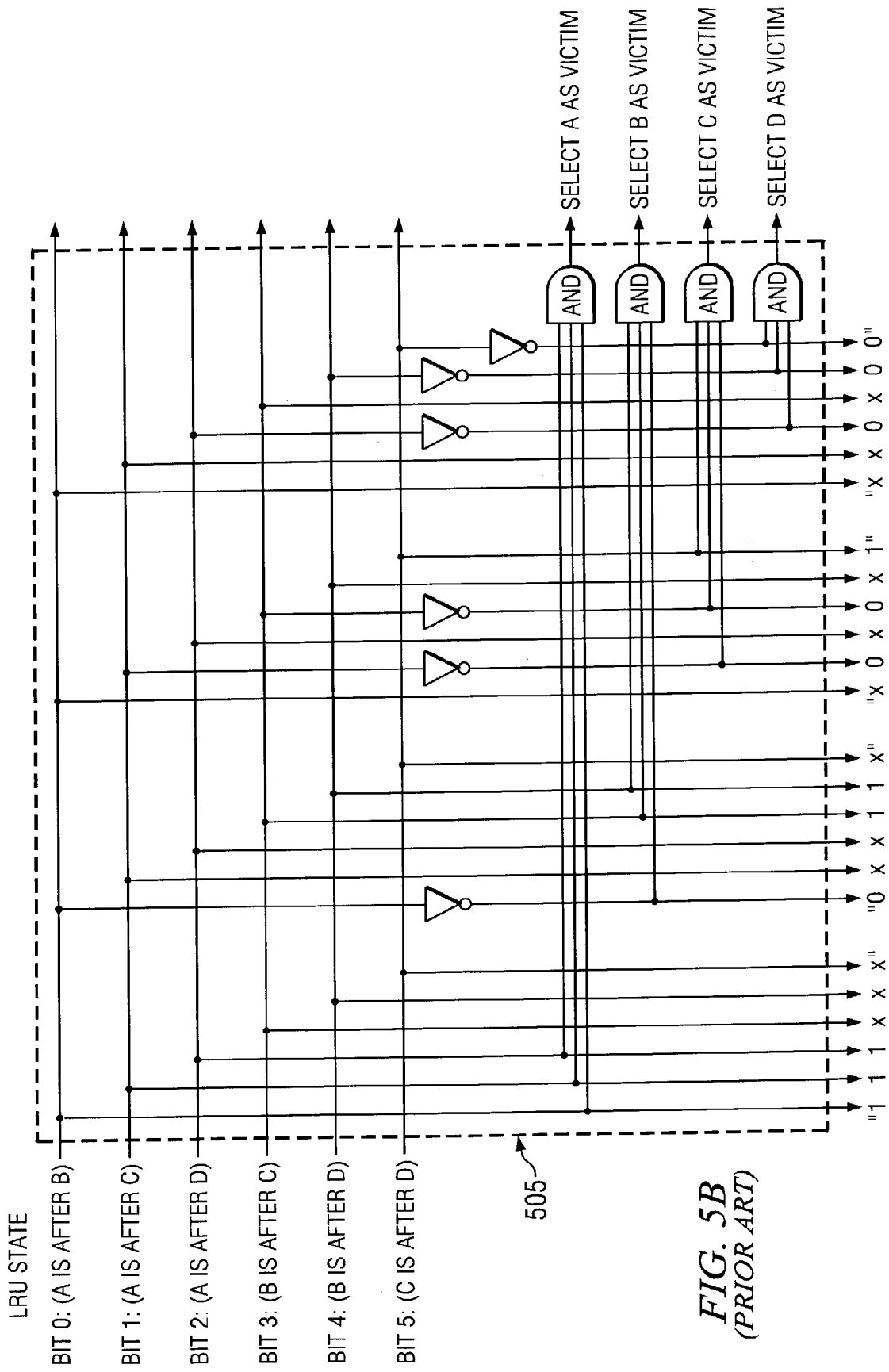
FIG. 5B is a circuit diagram of a known LRU-victim-selection function.

For example, referring now to FIG. 5A, the constant patterns are shown for a 501, b 502, c 503, and d 504. With reference to FIG. 5B, circuit diagram 505 illustrates the LRU-victim-selection function in a manner familiar to those skilled in the art. Constant patterns 501, 502, 503, and 504, from FIG. 5A are used to annotate the information lines in circuit diagram 505 in FIG. 5B to associate each constant pattern with the set of information lines that feeds the constant comparator equation for that pattern.

As associativity increases the chronology vector technique can become prohibitively expensive. Those skilled in the art will recognize that less expensive "pseudo-LRU" policies are possible, which policies are roughly equal to "true" LRU behavioral value, but may be implemented in hardware with fewer bits required to track LRU state.

One such policy, well known in the art, is the tree-based pseudo-LRU approach. In this hierarchical approach, a set of multiple chronology vectors are organized as a tree of arbitrary depth. For non-leaf nodes of the tree, the number of branches from the node is equal to the number of entities ordered by the vector. Each leaf node of the tree defines the order amongst a subset of the members in a congruence class equal in number to the ordering capacity of the vector.

Figure 6:
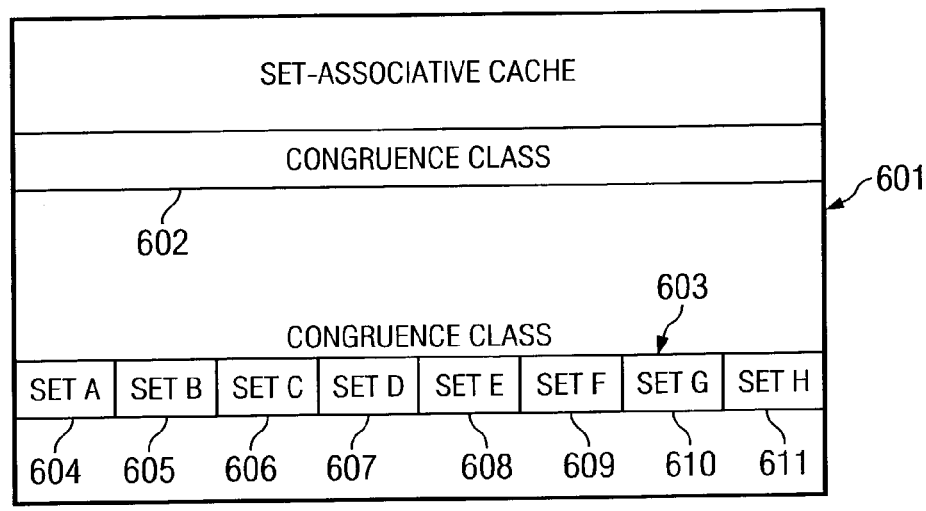
FIG. 6 is a diagram of an 8-way associative cache.

To illustrate this, referring now to FIG. 6, an 8-way associative cache 601 is shown. Cache 601 is comprised of multiple congruence classes 602 and 603, which are typically selected by a subset of the address of the cache line being referenced. Each congruence class is comprised of eight members, member A 604, member B 605, member C 606, member D 607, member E 608, member F 609, member G 610, and member H 611.

Often, tree-based LRU implementations are comprised of single bit (2-entity) chronology vectors. For example, referring now to FIG. 7, examples of tree based LRU structures are illustrated. In this example, vector 700 forms the basis for each node in a binary tree 702, which is 3 levels deep in this example. Binary tree 702 contains nodes 704, 706, 708, 710, 712, 714, and 716. Seven single bit vectors, vectors 718, 720, 722, 724, 726, 728, and 730, are provided to track the state for a binary-tree LRU scheme governing the 8-way associative cache with member positions A 732, B 734, C 736, D 738, E 740, F 742, G 744, and H 746.

Figure 7:
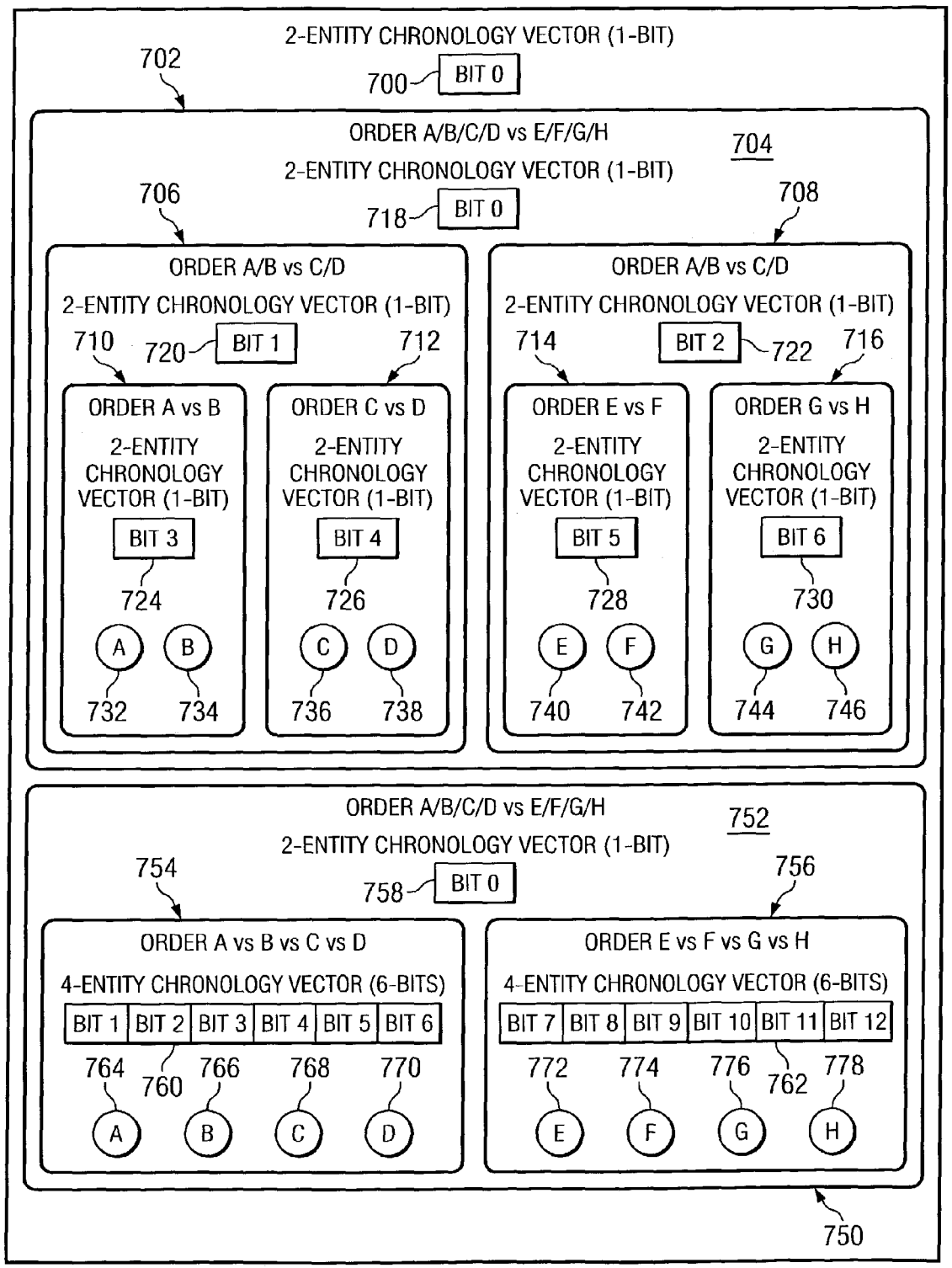
FIG. 7 is a diagram of example tree based LRU structures.

In another example, still referring to FIG. 7, a combination of (2-entity) and (4-entity) vectors are used to construct a different tree-based LRU scheme, as illustrated by tree structure 750 for an 8-way associative cache. In this example, tree structure 750 includes nodes 752, 754, and 756. Node 752 includes one bit chronology vector 758, while node 754 contains six bit chronology vector 760, and node 756 contains six bit chronology vector 762. These vectors are used to point to member positions A 764, B 766, C 768, D 770, E 772, F 774, G 776, and H 778.

Figure 8:
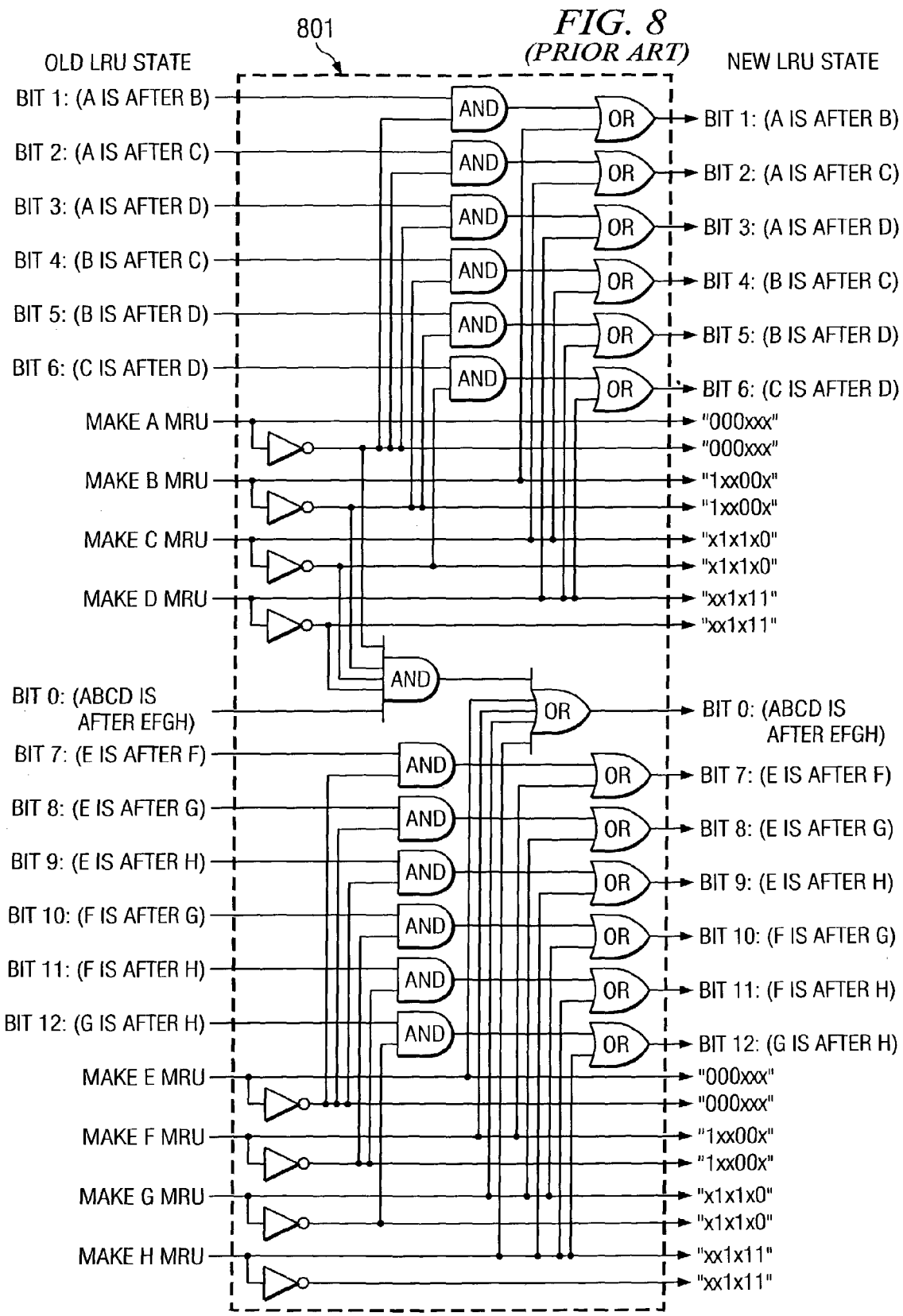
FIG. 8 is a circuit diagram of an MRU-update function.

Referring now to FIG. 8, a circuit diagram 801 illustrates the combination of varying size chronology vectors with a tree-based scheme embodied in an MRU-update function for the tree structure 750 shown in FIG. 7.

Figure 9A:
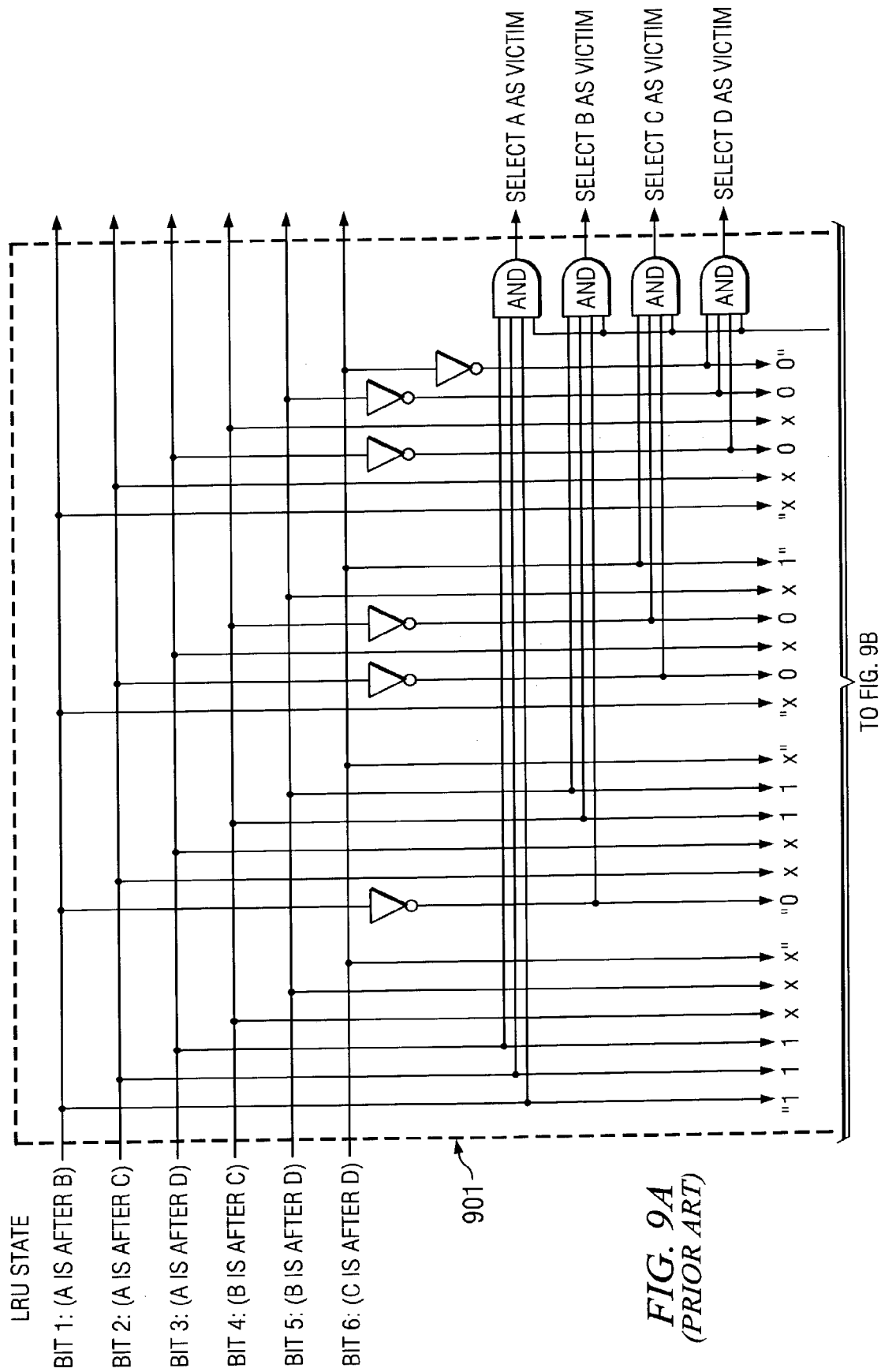
FIG. 9A and FIG. 9B are a circuit diagram of an LRU victim selection function.
Figure 9B:
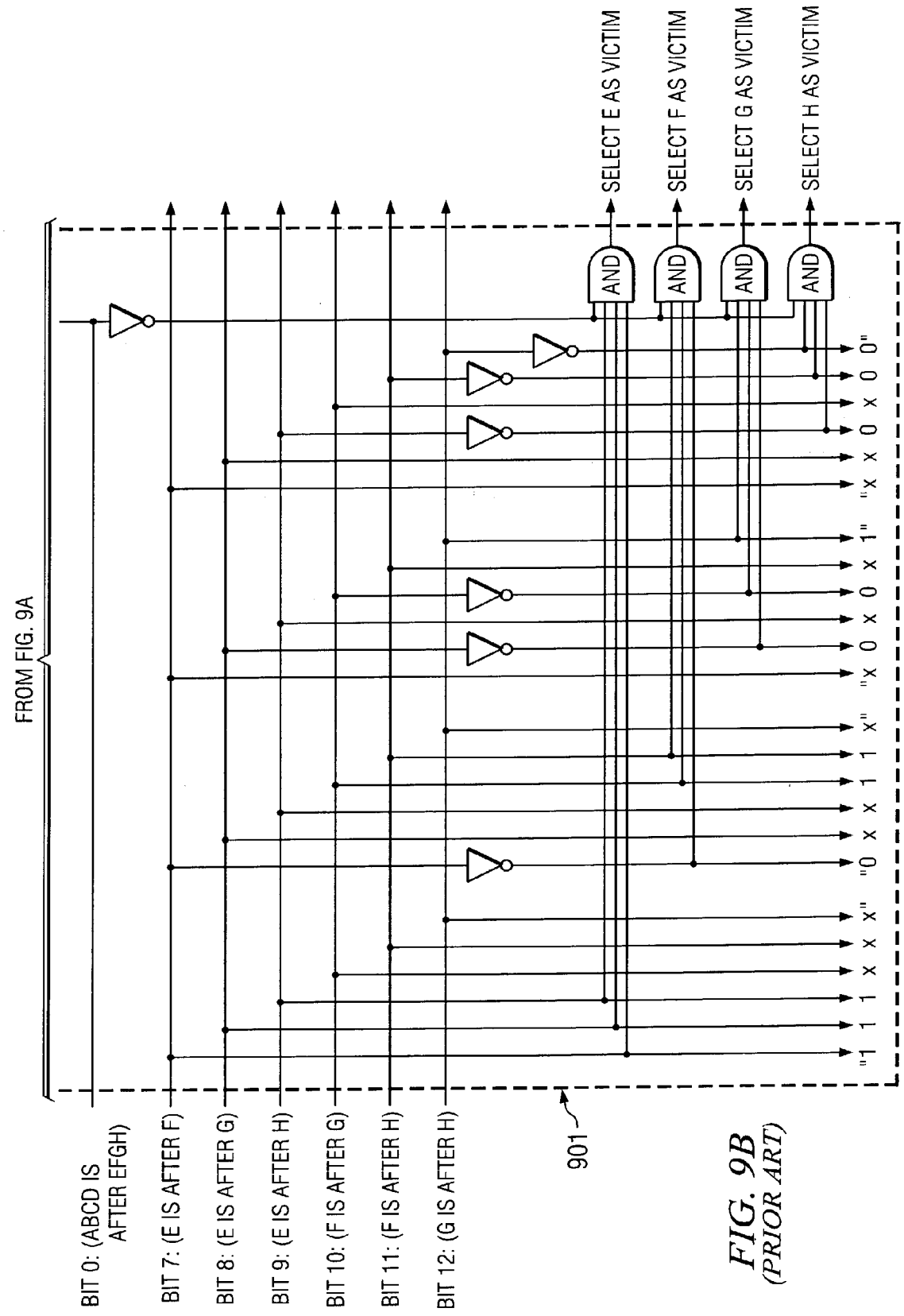

Referring now to FIG. 9A and FIG. 9B, a circuit diagram 901 illustrates the combination of varying size chronology vectors with a tree-based scheme embodied in an LRU victim selection function for the LRU tree 750 shown in FIG. 7.

Often, least recently used victim selection may be augmented in various ways. One such way is with an invalid member select override policy. The coherency state of a given cache line occupying a member in the cache can be useful in determining whether or not that member should be replaced. If the cache line is not valid, it is an ideal candidate for replacement, since nothing is lost when the cache line is over-written by a newly allocated cache line. The invalid member select override policy determines whether an invalid member exists in the congruence class from which a victim must be selected. If one or more such members exist, the policy chooses one of them as a victim, overriding the victim selected by the primary selection policy. Often, favorable operating characteristics and reduced complexity implementations for a cache can be achieved when the victim selection and state update portions of a cache allocation policy are tightly integrated with a common pipeline for accessing the cache arrays, directory arrays, and allocation policy (e.g. LRU) state arrays.

Further, in such implementations, further benefits are typically derived when the victim selection occurs as early as possible in the common pipeline, and when for each operational use of the pipeline, at most one cache allocation policy state update is performed.

Figure 10:
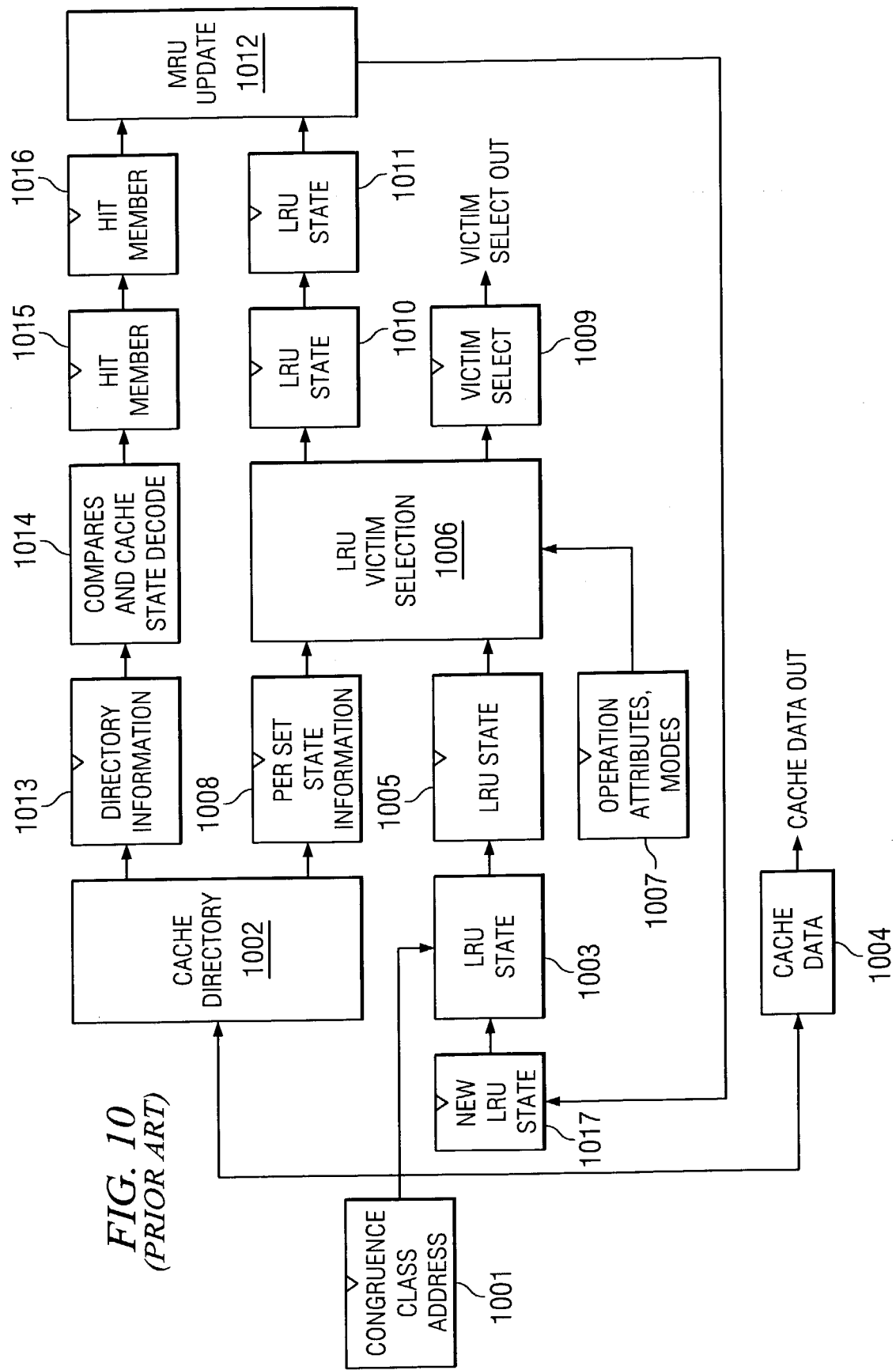
FIG. 10 is a diagram of a known cache architecture.

Referring now to FIG. 10, a cache architecture is illustrated. The cache congruence class index (or address) is held in latch 1001. From there, the address is simultaneously routed to the directory array 1002, the LRU state array 1003, and, for operations which speculatively read the cache, to the data array 1004.

From LRU state array 1003, the state information for the accessed congruence class is read and deposited into latch 1005. The state bits 0 through 12 of LRU tree 750, found in FIG. 7 are an example of such state information.

From staging latch 1005, the LRU state information is routed to least recently used (LRU) victim selection logic 1006, which is comprised largely of LRU victim selection logic such as that shown in circuit diagram 901, found in FIG. 9A and FIG. 9B. This logic always chooses a potential victim, whether one is needed or not. The selected victim member position is deposited in latch 1009. If selected victim was not needed, the LRU state will not be changed accordingly. This function will be described with the MRU update logic.

In addition to speculatively selecting a victim, victim selection logic 1006 also passes along some or all of the LRU state information to MRU update logic 1012, via pipelined latches 1010 and 1011. For implementations which cannot selectively write some bits to a given entry in LRU state array 1003, while leaving other bits in that entry unchanged, latches 1010 and 1011 must convey all the LRU state information (since all bits will be written when the array is updated). For implementations which can selectively write some bits to an entry in array 1003, while leaving other bits in that entry unchanged, latches 1010 and 1011 need only an indication of which member was selected as a victim.

A subset of the attributes of an operation and/or static mode switch settings is placed in latch 1007. From there, it is routed to LRU victim select logic 1006, which may be augmented by a set of operational modes and possibly by one or more congruence class partitioning policies, well known to those of ordinary skill in the art.

Referring once again to FIG. 10, the least recently used victim selection logic 1006 may also be augmented by an invalid member select override policy. The invalid member select override policy makes use of cache member state information typically found in the cache directory 1002. A subset of the coherency state information (e.g., the valid bit) for all the members in the congruence class (indexed by 1001) is read from the directory 1002 and placed in latch 1008. From there, it is routed to the LRU victim select logic 1006, which may be augmented by an invalid member select override policy.

Figure 11:
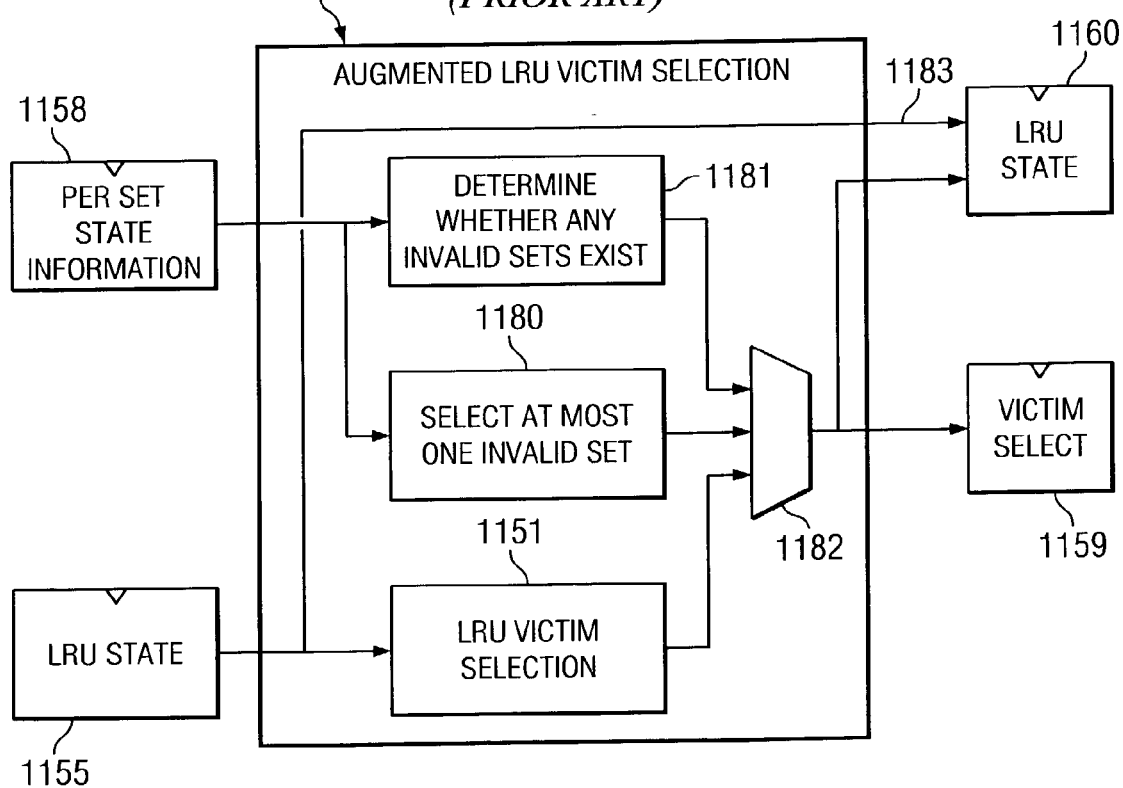
FIG. 11 is an illustration of a known LRU victim selection logic augmented with a known invalid member select override policy.

An example of this augmentation is shown in FIG. 11, which is an illustration of an augmented LRU victim selection logic. LRU victim selection logic 1006 from FIG. 10 is expanded as shown in augmented LRU victim selection 1156 in FIG. 11. Likewise, latch 1005 in FIG. 10 is shown as latch 1155, latch 1008 is shown as latch 1158, latch 1009 is shown as 1159, and latch 1010 is shown as 1160.

The invalid member select override policy determines whether an invalid member exists in the congruence class from which a victim must be selected in block 1181. If one or more such members exist, the policy chooses one of them as a victim in block 1180, overriding in MUX 1182 the victim selected by the primary selection policy 1151.

Note that the exact LRU state information routed to latch 1160 by path 1183, is necessary only in the case where the LRU state array (block 1003 of FIG. 10) does not have a selective (per bit) write capability.

Referring once again to FIG. 10, the MRU update logic 1012 receives a pipelined indication of which member was speculatively selected as a potential victim from staging latch 1011. Meanwhile, the contents of the associated congruence class lookup in the directory 1002 were latched 1013 and routed to the compare and decode logic 1014.

The compare and decode logic 1014 determines whether the operation is a cache hit, and if so, which member in the congruence class is the hit member. This logic also determines whether or not the operation must be aborted due to a collision with a protected resource, or due to a permission conflict between the operation type and the coherence state of the cache line.

The "hit member" information indicates one of the following: no operation occurred (either there was no operation at that time or the operation was aborted), a cache miss occurred, or a cache hit occurred against a given member position. The "hit member" information is deposited into latch 1015, and pipelined forward to latch 1016, from which it is routed to the MRU update logic 1012.

In the MRU update logic 1012, the following information is collected for a given operation: whether or not an operation occurred (from latch 1016); if it occurred, whether the operation was a hit or miss (from latch 1016); if it was a hit, which member position contained the cache line that was hit (from latch 1016); if it was a miss, which member position was chosen to allocate the new cache line (from latch 1011).

If no operation occurred, the LRU state will remain unchanged. If a hit operation occurred, the LRU state will be updated such that the hit member position is established as MRU. If a miss operation occurred, the LRU state will be updated such that the allocated member position is established as MRU. Circuit diagram 801 in FIG. 8 shows an example implementation of this MRU update function.

The updated LRU state information is deposited in latch 1017, poised for writeback into the LRU state array 1003. For implementations which cannot selectively write some bits to a given entry in the LRU state array 1003, while leaving other bits in that entry unchanged, latch 1017 holds the entire contents of the entry to be written into the array. It must convey all the LRU state information (since all bits will be written when the array is updated). For implementations which can selectively write some bits to an entry in array 1003, while leaving other bits in that entry unchanged, latch 1017 consists of a write enable mask (indicating which bits of the entry will be written), as well as a vector of update bit values (for bits that will be written according to the mask).

Those of ordinary skill in the art will recognize the following properties. The state information for the invalid member selection override exists in the directory 1002. As caches grow larger (affecting size of data array 1004, directory array 1002, and LRU state array 1003), the latency through a directory 1002 and to the victim selection logic 1006 grows relative to the latency through the LRU state array 1003 to the victim selection logic 1006. Also, the circuit complexity (and latency) grows (as shown in FIG. 11) beyond what is shown in circuit diagram 901 of FIG. 9A and FIG. 9B. Increases in the aggressiveness of processor operating frequencies compound this latency difference, making it more and more difficult to balance the desire to select a victim early with difference in latency between early arriving LRU state info (from latch 1005) and ever-later arriving invalid cache state info (from latch 1008).

Figure 12:
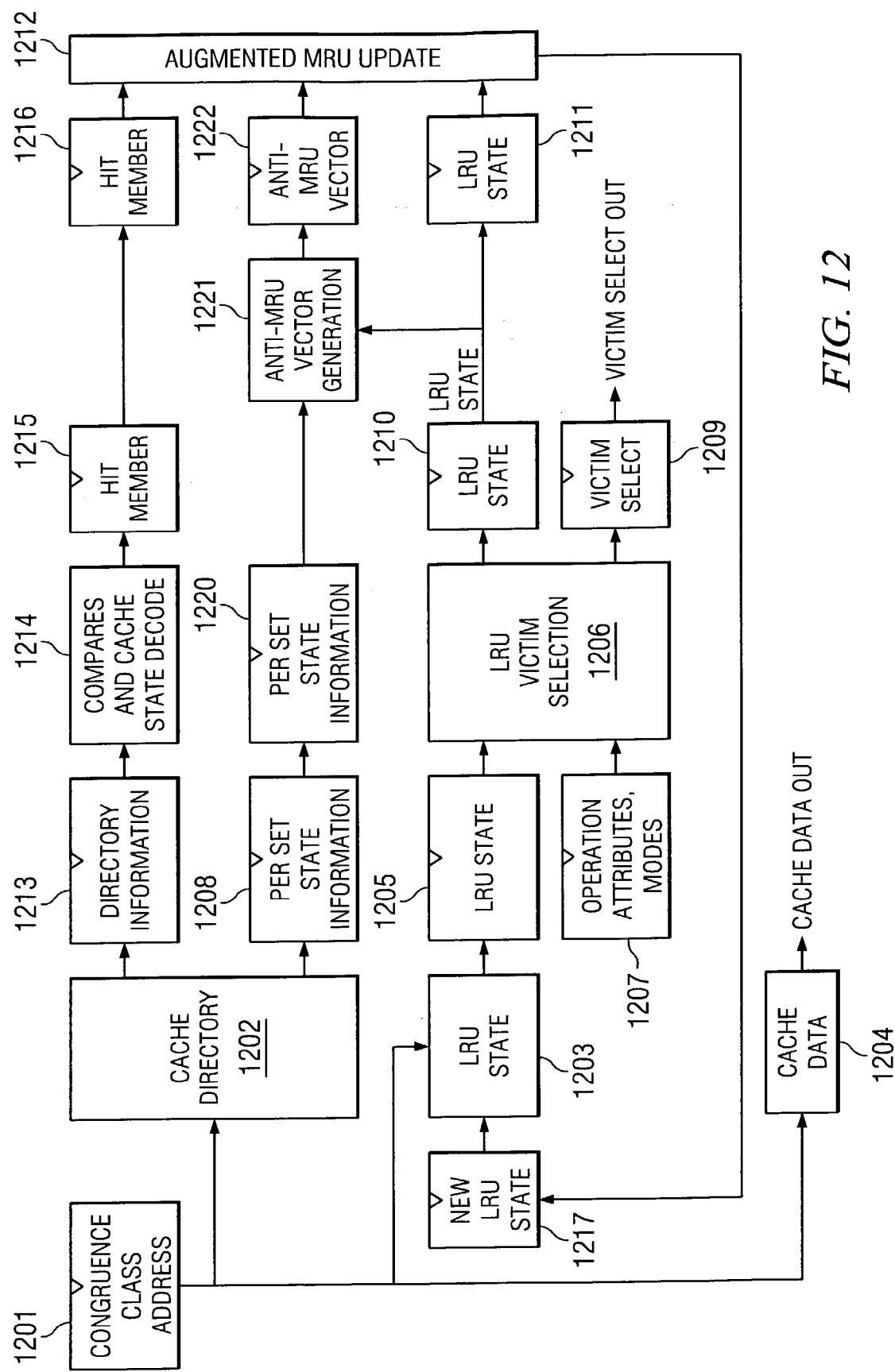
FIG. 12 is a cache architecture including LRU augmentations in accordance with a preferred embodiment of the present invention.

Referring now to FIG. 12, a cache architecture including LRU augmentations is depicted in accordance with a preferred embodiment of the present invention. In this example, the cache congruence class index (or address) is held in latch 1201. From there, the address is simultaneously routed to the directory array 1202, the LRU state array 1203, and, for operations which speculatively read the cache, to the data array 1204.

From LRU state array 1203, the state information for the accessed congruence class is read and deposited into latch 1205. The state bits 0 through 12 of LRU tree 750, found in FIG. 7 are an example of such state information.

From staging latch 1205, the LRU state information is routed to least recently used (LRU) victim selection logic 1206, which is comprised largely of LRU victim selection logic such as that shown in circuit diagram 901, found in FIG. 9A and FIG. 9B. This logic always chooses a potential victim, whether one is needed or not. The selected victim member position is deposited in latch 1209. If selected victim was not needed, the LRU state will not be changed accordingly. This function will be described with the MRU update logic.

In addition to speculatively selecting a victim, victim selection logic 1206 also passes along some or all of the LRU state information to MRU update logic 1212, via pipelined latches 1210 and 1211. For implementations which cannot selectively write some bits to a given entry in LRU state array 1203, while leaving other bits in that entry unchanged, latches 1210 and 1211 must convey all the LRU state information (since all bits will be written when the array is updated). For implementations which can selectively write some bits to an entry in array 1203, while leaving other bits in that entry unchanged, latches 1210 and 1211 need only an indication of which member was selected as a victim.

A subset of the attributes of an operation and/or static mode switch settings are placed in latch 1207. From there, it is routed to LRU victim select logic 1206, which may be augmented by a set of operational modes and possibly by one or more congruence class partitioning policies.

To avoid the circuit timing challenges imposed by the invalid member select override policy described in FIG. 10, the mechanism of the present invention utilizes invalid member information to bias the LRU state when an LRU state update occurs, not during victim selection.

To this purpose, the cache line valid information read from the directory 1202 and placed in latch 1208, is no longer routed to the victim select logic 1206. Rather the invalid member select override policy is removed altogether from victim select logic 1206.

Instead, the information from latch 1208 is pipelined through latch 1220 to the anti-MRU vector generation logic 1221. This information consists of a vector (from latch 1220) comprised of one bit per member in the congruence class. For each member, the bit indicates whether or not the member is valid, with a "1" value indicating that the cache line in a given member position is valid, and a "0" value indicating that the cache line in a given member position is not valid (i.e., desirable for replacement).

The LRU state vector (from latch 1210) is also routed to the anti-MRU vector generation logic 1221. From this state vector, the victim member selected by logic 1206 is determined.

An anti-MRU vector is generated by altering the informational vector from latch 1220 in the following manner: All of the bits in the informational vector from latch 1220 are passed unchanged to the anti-MRU vector, with the exception of the bit corresponding to the victim member (as indicated in the LRU state vector information from latch 1210). This particular bit in the anti-MRU vector is set to a "1" value. This will prevent the update logic from biasing the allocated member (which should be marked as MRU) with an anti-MRU update.

The anti-MRU vector is deposited in latch 1222, from which it is routed to the augmented MRU update logic 1212. In addition, the augmented MRU update logic 1212 receives a pipelined indication of which member was speculatively selected as a potential victim from staging latch 1211. Meanwhile, the contents of the associated congruence class lookup in the directory 1202 were latched 1213 and routed to the compare and decode logic 1214.

The compare and decode logic 1214 determines whether the operation is a cache hit, and if so, which member in the congruence class is the hit member. It also determines whether or not the operation must be aborted due to a collision with a protected resource, or due to a permission conflict between the operation type and the coherence state of the cache line.

The "hit member" information indicates one of the following: no operation occurred (either there was no operation at that time or the operation was aborted), a cache miss occurred, or a cache hit occurred against a given member position. The "hit member" information is deposited into latch 1215, and pipelined forward to latch 1216, from which it is routed to MRU update logic 1212.

In augmented MRU update logic 1212, the following information is collected for a given operation: whether or not an operation occurred (from latch 1216); if it occurred, the anti-MRU vector (from latch 1222); if it occurred, whether the operation was a hit or miss (from latch 1216); if it was a hit, which member position contained the cache line that was hit (from latch 1216); if it was a miss, which member position was chosen to allocate the new cache line (from latch 1211).

If no operation occurred, the LRU state will remain unchanged. If a hit operation occurred, the LRU state will be updated such that the hit member position is established as MRU. If a miss operation occurred, the LRU state will be updated such that the allocated member position is established as MRU.

In addition, if any operation occurred, an "anti-MRU" update occurs for each member in the congruence class indicated by the anti-MRU vector. The anti-MRU update performs the opposite function as an MRU update. While an MRU-update reorders one member with respect to all other members, establishing that one member as the most favored, an anti-MRU update reorders one member with respect to all other members, establishing that one member as the least favored.

MRU update logic 1212 takes advantage of a property of chronology vectors, which property allows multiple update operations to be carried out upon a chronology vector simultaneously. Utilizing this property, the MRU update function performs one MRU-update and multiple "anti-MRU" updates simultaneously.

Of course, given the definition of these operations, their behavior can only be defined as occurring in some particular order relative to one another. When taking advantage of chronology vectors to perform multiple updates simultaneously, the ordering is biased either toward "1" encodings (set-dominant) or "0" encodings (reset-dominant).

In these examples, cache directory 1202 is read for both hits and misses. An MRU update by augmented MRU update logic 1212 occurs in both cases. As a result, an anti-MRU bias for a given congruence class may be performed for any hit or miss to that congruence class.

Figure 13A:
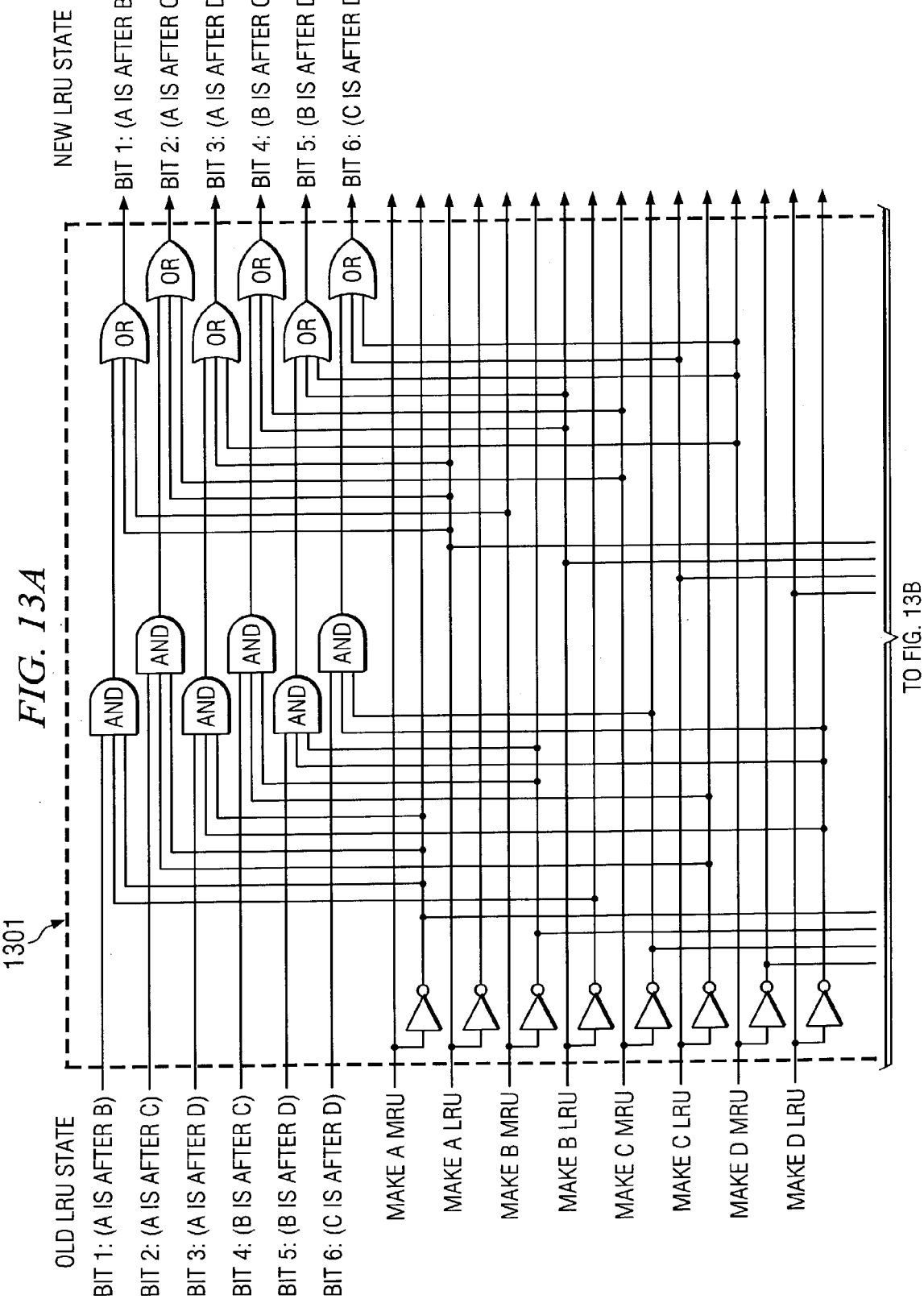
FIG. 13A and FIG. 13B are a diagram of an example implementation of this MRU update function, augmented by the multi-anti-MRU update invalid selection bias capability in accordance with a preferred embodiment of the present invention.
Figure 13B:
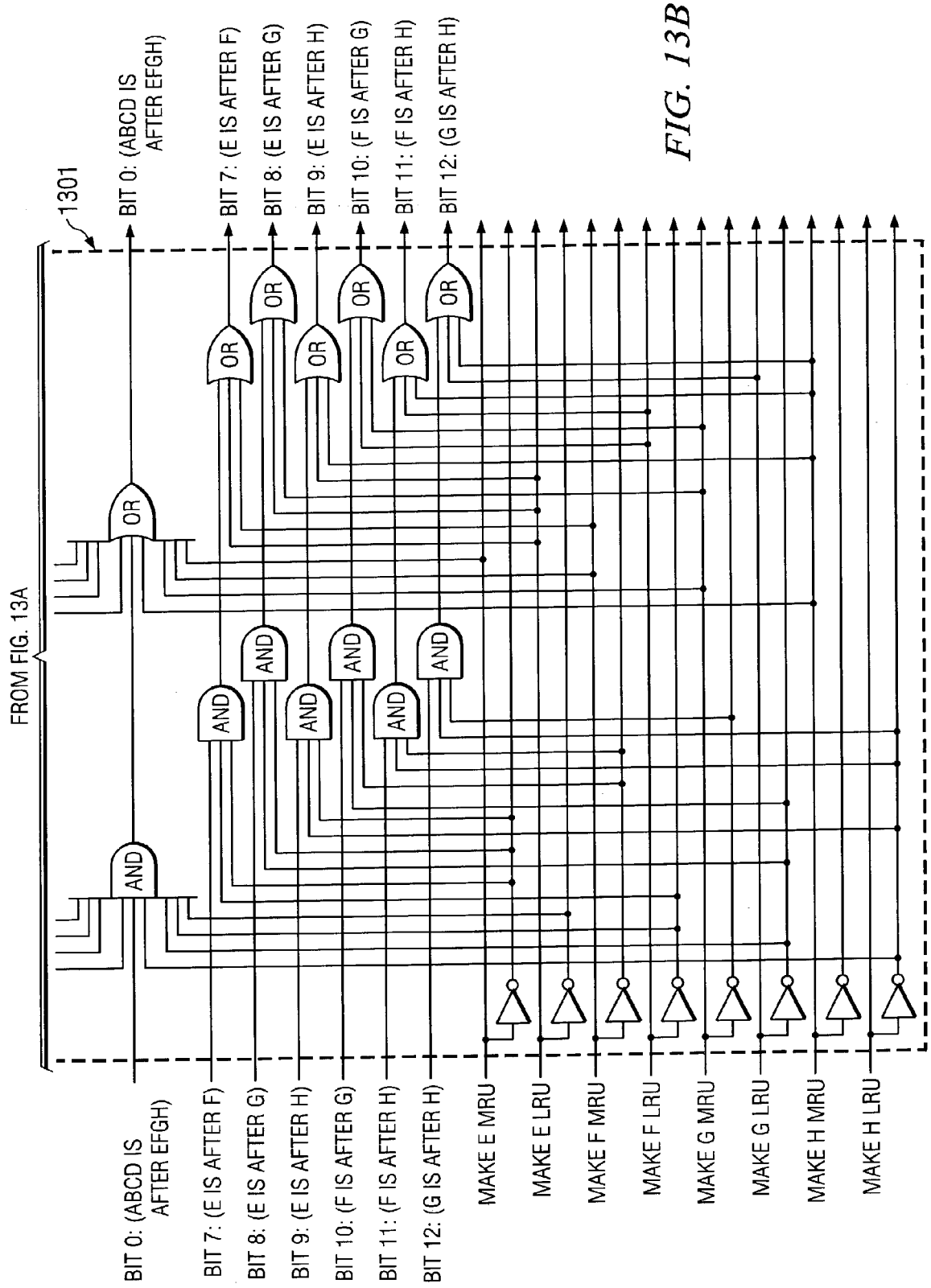

Circuit diagram 1301, in FIG. 13A and FIG. 13B, shows an example implementation of this MRU update function, augmented by the multi-anti-MRU update invalid selection bias capability in accordance with a preferred embodiment of the present invention.

Referring once again to FIG. 12 the updated LRU state information is deposited in latch 1217, poised for writeback into the LRU state array 1203. For implementations which cannot selectively write some bits to a given entry in the LRU state array 1203, while leaving other bits in that entry unchanged, latch 1217 holds the entire contents of the entry to be written into the array. It must convey all of the LRU state information (since all bits will be written when the array is updated). For implementations which can selectively write some bits to an entry in array 1203, while leaving other bits in that entry unchanged, latch 1217 consists of a write enable mask (indicating which bits of the entry will be written), as well as a vector of update bit values (for bits that will be written according to the mask).

Thus, the present invention provides an improved method, apparatus, and computer instructions for augmenting the least recently used process for selecting victims for replacing cache lines in a cache system. The mechanism of the present invention uses data indicating validity of cache lines to identify invalid lines. In response to detecting one of these invalid lines, the invalid line is marked or biased to be a least recently used cache line. This line is marked or biased to be a victim in response to a subsequent miss, rather than the current victim. In this manner, this invalid cache line becomes the subsequent victim and is discarded when the subsequent cache miss occurs. In the depicted examples, the invalid cache line is identified at the same time a victim is identified. The invalid cache line is not discarded until a subsequent miss occurs. If multiple invalid cache lines are present, one of those cache lines may be selected to be the subsequent victim based on a policy. This policy may be, for example, one that selects a subsequent victim randomly or based upon some priority scheme.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for managing cache lines in a cache, the method comprising:
   receiving data on validity of cache lines when a selection of a current victim to be discarded is made in response to a cache miss;
   responsive to detecting an invalid cache line, selecting the invalid cache line as a subsequent victim such that the subsequent victim is discarded when a subsequent cache miss occurs; and
   selecting the invalid cache line as the subsequent victim by designating the invalid cache line as a least recently used cache line.

2. The method of claim 1, wherein the selection of the current victim is made using a least recently used policy.

3. The method of claim 1, wherein the method is used to manage cache lines in at least one of a level 1 cache and a level 2 cache.

4. The method of claim 1, wherein the subsequent victim is not the current victim.

5. The method of claim 1, wherein the receiving step is performed in an anti-most recently used vector generation logic.

6. The method of claim 1 further comprising:
   receiving data on validity of cache lines in response to a cache hit; and
   responsive to detecting an invalid cache line, selecting the invalid cache line as a subsequent victim such that the subsequent victim is discarded when a subsequent cache miss occurs.

7. A cache management apparatus, the apparatus comprising:
   an invalid cache line selection unit having a first input and an output;
   a cache directory having an output connected to the input of the invalid cache line selection unit, wherein the cache directory includes data used to determine validity of cache lines in a cache;
   least recently used victim selection unit having an output connected to a most recently used update logic; and
   most recently used update logic having a first input connected to an output of the cache directory, a second input connected to the output of invalid cache line selection unit, and a third input connected to the least recently used victim selection unit,
   wherein the cache directory sends validity information on cache lines to the vector generation logic, invalid cache line selection unit sends an indicator to the most recently used update logic to bias an invalid cache line as a least recently used cache line, the most recently used update logic updates the invalid cache line in a least recently used state as the recently used cache line causing the invalid cache line to be selected as a victim to be discarded in when a miss occurs.

8. The cache management apparatus of claim 7, wherein the cache directory is connected to the most recently used update logic by a compare and decode logic, which generates an indication of a hit or a miss.

9. The cache management apparatus of claim 7, wherein least recently used victim selection logic includes an output connected to the invalid cache line selection unit, in which a selection of a victim cache line as a cache line to be discarded results in an inability of the invalid cache line selection unit to bias the victim cache line as a least recently used cache line.

10. A data processing system for managing cache lines in a cache, the data processing system comprising:
    receiving means for receiving data on validity of cache lines when a selection of a current victim to be discarded is made in response to a cache miss; and
    selecting means, responsive to detecting an invalid cache line, for selecting the invalid cache line as a subsequent victim such that the subsequent victim is discarded when a subsequent cache miss occurs, wherein the invalid cache line is selected as the subsequent victim by designating the invalid cache line as a least recently used cache line.

11. The data processing system of claim 10, wherein the selection of the current victim is made using a least recently used policy.

12. The data processing system of claim 10, wherein the method is used to manage cache lines in at least one of a level 1 cache and a level 2 cache.

13. The data processing system of claim 10, wherein the subsequent victim is not the current victim.

14. The data processing system of claim 10, wherein the receiving step is performed in an anti-most recently used vector generation logic.

15. The data processing system of claim 10, wherein the receiving means is a first receiving means and the selecting means is a first selecting means and further comprising:
    first receiving means for receiving data on validity of cache lines in response to a cache hit; and
    second selecting means, responsive to detecting an invalid cache line, for selecting the invalid cache line as a subsequent victim such that the subsequent victim is discarded when a subsequent cache miss occurs.

* * * * *